United States Patent
Banerjee et al.

(10) Patent No.: US 9,995,588 B2
(45) Date of Patent: Jun. 12, 2018

(54) QUANTIFYING ANOMALOUS BEHAVIOR BY IDENTIFYING ANOMALIES AT SUBTRAJECTORIES

(71) Applicant: International Business Machines Corporation, Armonk, NY (US)

(72) Inventors: Prithu Banerjee, Chinsurah (IN); Biplav Srivastava, Noida (IN); Srikanth Govindaraj Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 14/747,883

(22) Filed: Jun. 23, 2015

(65) Prior Publication Data
US 2016/0377441 A1    Dec. 29, 2016

(51) Int. Cl.
*G01C 21/00* (2006.01)
*G01C 21/34* (2006.01)

(52) U.S. Cl.
CPC ..... *G01C 21/3446* (2013.01); *G01C 21/3438* (2013.01); *G01C 21/3492* (2013.01)

(58) Field of Classification Search
CPC .................. G01C 21/3446; G01C 21/3438
See application file for complete search history.

(56) References Cited

U.S. PATENT DOCUMENTS

| 5,381,155 A | 1/1995 | Gerber |
| 6,265,989 B1 | 7/2001 | Taylor |
| 7,389,178 B2 | 6/2008 | Raz et al. |
| 8,260,491 B2 | 9/2012 | Brighenti et al. |
| 8,494,759 B2 | 7/2013 | Hada |

(Continued)

FOREIGN PATENT DOCUMENTS

| CN | 102542831 B | 4/2014 |
| EP | 2778007 A1 | 9/2014 |

OTHER PUBLICATIONS

Li, Xiaolei, et al., "Temporal Outlier Detection in Vehicle Traffic Data", 25th International Conference on Data Engineering (ICDE '09), Shanghai, China, Mar. 29-Apr. 2, 2009, pp. 1319-1322, IEEE Digital Library.

(Continued)

*Primary Examiner* — Adam M Alharbi
(74) *Attorney, Agent, or Firm* — Ference & Associates LLC (57) ABSTRACT

Methods and arrangements for identifying at least one anomaly in a path taken by a plurality of objects. A plurality of trajectories are input, wherein each trajectory comprises a data set indicative of a path taken by a plurality of objects from a starting point to an ending point, wherein the starting point and ending point are substantially similar for each trajectory. A plurality of sub-trajectories within the input trajectories are identified. There are identified, within the plurality of sub-trajectories, a set of sub-trajectories that are anomalous when compared to other sub-trajectories within the plurality of sub-trajectories, wherein the anomalous sub-trajectories deviate from a predetermined standard. A maximal anomalous sub-trajectory is identified from among the identified set of anomalous sub-trajectories. Other variants and embodiments are broadly contemplated herein.

19 Claims, 5 Drawing Sheets

101

(56) References Cited

U.S. PATENT DOCUMENTS

| 8,630,795 B2 | 1/2014 | Breed et al. | |
|---|---|---|---|
| 8,653,986 B2 | 2/2014 | Tamir et al. | |
| 2006/0074302 A1* | 4/2006 | Meier | A61N 5/1049 600/427 |
| 2010/0054602 A1* | 3/2010 | Kaehler | G06K 9/00429 382/186 |
| 2011/0301832 A1* | 12/2011 | Zheng | G01C 21/3484 701/425 |

OTHER PUBLICATIONS

Jiang, Fan, et al., "Detecting Anomalous Trajectories from Highway Traffic Data", Electrical Engineering and Computer Science Department, Northwestern University, Evanston, Illinois, 2009, 4 pages, Copy available at: http://www.ccitt.northwestern.edu/documents/2009.Jiang_Tsaftaris_Wu_Katsaggelos_pub.pdf, Accessed on Apr. 22, 2015.

Wang, Jianyong, et al., "Frequent Closed Sequence Mining without Candidate Maintenance", IEEE Transactions on Knowledge and Data Engineering, Aug. 2007, 15 pages, vol. 19, No. 8, IEEE Computer Society.

Laxhammar, Rikard, "Conformal Anomaly Detection—Detecting abnormal trajectories in surveillance applications", Doctoral Dissertation, Dissertation Series No. 3, University of Skovde, Sweden, 2014, 206 pages, Runit AB, Skovde, Sweden.

Chen, Chao, et al., "Real-Time Detection of Anomalous Taxi Trajectories from GPS Traces", 8th International ICST Conference on Mobile and Ubiquitous Systems (MobiQuitous), Copenhagen, Denmark, Dec. 6-9, 2011, pp. 63-74, Institute for Computer Sciences, Social Informatics and Telecommunications Engineering, 2012, LNICST 104, Lecture Notes, Springer Publishing Company, New York, NY, USA.

* cited by examiner

QUANTIFYING ANOMALOUS BEHAVIOR BY IDENTIFYING ANOMALIES AT SUBTRAJECTORIES

BACKGROUND

Location tracking sensors have proliferated and there has come to exist an abundance of data in the form of trajectories. Such datasets are rich in information and have consequently attracted much attention in disciplines relating to data analytics. Trajectory datasets have been mined and analyzed for applications such as cellular network optimization, emergency detection, and taxi-route suggestions. Generally, a trajectory dataset can be regarded as being indicative of paths taken by objects from a starting point to an ending point, wherein "object" can refer to any physical or other entity describing a "path" defined by essentially any physical or other parameter.

Generally, in analyzing trajectories, an anomaly is defined as an observation (or set of observations) that deviate(s) significantly from the rest of the data (e.g., with respect to a predetermined standard); thus, an anomalous trajectory or sub-trajectory represents a trajectory or sub-trajectory that so deviates. This can amount to pinpointing one or more smaller trajectories that qualify as anomalies in the context of one or more larger trajectories. Challenges continue to be encountered in efficiently finding and designating such anomalies, and viable, cost-effective solutions continue to elude.

BRIEF SUMMARY

In summary, one aspect of the invention provides a method of identifying at least one anomaly in a path taken by a plurality of objects, said method comprising: utilizing at least one processor to execute computer code that performs the steps of: inputting a plurality of trajectories, wherein each trajectory comprises a data set indicative of a path taken by a plurality of objects from a starting point to an ending point, wherein the starting point and ending point are substantially similar for each trajectory; identifying a plurality of sub-trajectories within the input trajectories; identifying a set of sub-trajectories, within the plurality of sub-trajectories, that are anomalous when compared to other sub-trajectories within the plurality of sub-trajectories, wherein the anomalous sub-trajectories deviate from a predetermined standard; and identifying a maximal anomalous sub-trajectory from among the identified set of anomalous sub-trajectories.

Another aspect of the invention provides an apparatus for identifying at least one anomaly in a path taken by a plurality of objects, said apparatus comprising: at least one processor; and a computer readable storage medium having computer readable program code embodied therewith and executable by the at least one processor, the computer readable program code comprising: computer readable program code configured to input a plurality of trajectories, wherein each trajectory comprises a data set indicative of a path taken by a plurality of objects from a starting point to an ending point, wherein the starting point and ending point are substantially similar for each trajectory; computer readable program code configured to identify a plurality of sub-trajectories within the input trajectories; computer readable program code configured to identify a set of sub-trajectories, within the plurality of sub-trajectories, that are anomalous when compared to other sub-trajectories within the plurality of sub-trajectories, wherein the anomalous sub-trajectories deviate from a predetermined standard; and computer readable program code configured to identify a maximal anomalous sub-trajectory from among the identified set of anomalous sub-trajectories.

An additional aspect of the invention provides a computer program product for identifying at least one anomaly in a path taken by a plurality of objects, said computer program product comprising: a computer readable storage medium having computer readable program code embodied therewith, the computer readable program code comprising: computer readable program code configured to input a plurality of trajectories, wherein each trajectory comprises a data set indicative of a path taken by a plurality of objects from a starting point to an ending point, wherein the starting point and ending point are substantially similar for each trajectory; computer readable program code configured to identify a plurality of sub-trajectories within the input trajectories; computer readable program code configured to identify a set of sub-trajectories, within the plurality of sub-trajectories, that are anomalous when compared to other sub-trajectories within the plurality of sub-trajectories, wherein the anomalous sub-trajectories deviate from a predetermined standard; and computer readable program code configured to identify a maximal anomalous sub-trajectory from among the identified set of anomalous sub-trajectories.

A further aspect of the invention provides a method comprising: inputting a plurality of trajectories comprising data sets, the data sets comprising speed distributions relative to vehicle travel over a road network; identifying anomalous one-length sub-trajectories with respect to the input trajectories; and thereupon identifying a maximal anomalous sub-trajectory via: adding at least one edge to each of the anomalous one-length sub-trajectories; finding the longest list of sub-trajectories that remain anomalous subsequent to said adding of at least one edge; and iterating said steps of adding and finding until a maximal anomalous sub-trajectory is determined.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an exemplary embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention, are methods and arrangements which provide automatic identification of anomalous paths or segments from trajectory data, including a maximal anomalous sub-trajectory. Further, there is broadly contemplated herein the identification of anomalous behavior of an individual based on an aggregation of anomalous trajectories.

The features discussed above, and others, relating to at least one embodiment of the invention, will be better appreciated from the discussion which follows.

In accordance with at least one embodiment of the invention, there are broadly contemplated herein methods and arrangements, inter alia, for mining maximal temporally anomalous sub-trajectories in a scalable manner. Solutions toward this end, and others, will now be appreciated from the ensuing discussion.

Figure 1:
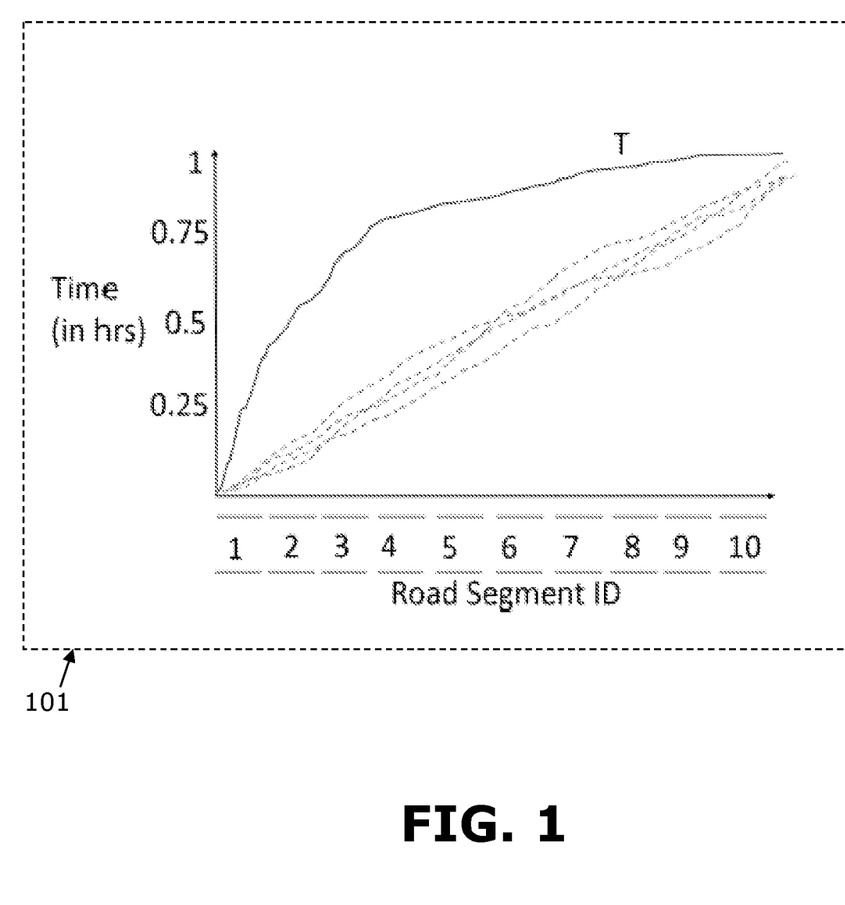
FIG. 1 graphically illustrates a general concept of temporally anomalous sub-trajectories.
Figure 2:
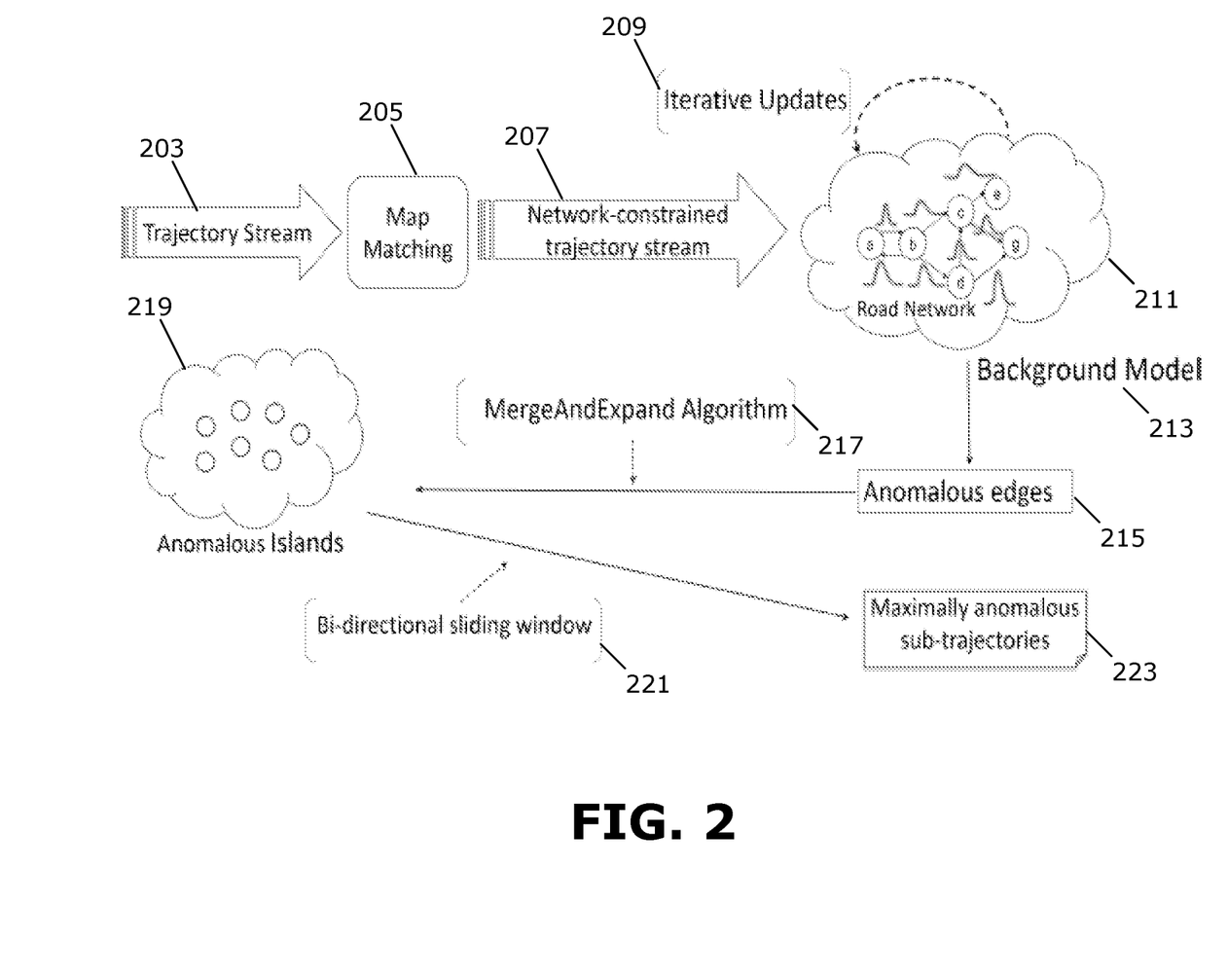
FIG. 2 schematically illustrates an overview of main steps in a procedure for mining maximal temporally anomalous sub-trajectories.

In accordance with a general background relative to at least one embodiment of the invention, FIG. 1 graphically illustrates a general concept of temporally anomalous sub-trajectories, via graph 101. Here, in a road travel scenario, the data involves trajectory streams with a goal to identify anomalous (vehicle) driving activities based on data that have arrived in the last one hour; FIG. 1 thus depicts the movement of 5 different trajectories that have arrived in this one hour window. All trajectories are traveling through the same route, which is broken down into ten (10) smaller road segments (shown on the x-axis). The y-axis denotes the time taken to cover the road segments. As shown in this example, most trajectories follow a similar pattern and maintain a uniform speed. On the other hand, the "outlier" trajectory, denoted as T, moves much more slowly until segment 3, whereupon it moves much faster than the rest of the population. Clearly, T deviates from the other trajectories, but this conclusion is elusive to reach mathematically. Particularly, T takes an hour to reach segment 10, yet all of the remaining trajectories take the same time as well.

In accordance with a general background relative to at least one embodiment of the invention, it can thus be appreciated that the above erroneous conclusion can be corrected if analysis is performed at a sub-trajectory level. More specifically, T's sub-trajectory from segment 1 to 3, denoted as T[1:3], is anomalous since T takes roughly 45 minutes to cover this distance as opposed to the approximately 15 minutes taken by the remaining trajectories. On the other hand, T[4:10] is anomalous since it takes roughly 30 minutes less to reach segment 10 from segment 4 than the remaining trajectories.

In accordance with a general background relative to at least one embodiment of the invention, the foregoing example highlights two important aspects of problems generally approached herein. First, a non-anomalous trajectory could contain anomalous sub-trajectories. Consequently, it becomes important to delve into a sub-trajectory space, which grows quadratically with the number of segments in a trajectory and thus poses a significant scalability challenge. The subtrajectory-level analysis also permits capturing semantics of the anomalies since (in an example of vehicle driving) a sub-trajectory could be anomalous due to under-speeding or over-speeding. Secondly, all anomalous subtrajectories are not equally informative. In FIG. 1, the sub-trajectory T[1:2] is also anomalous. However, given the fact that T[1:2] is a sub-sequence of T[1:3], T[1:2] does not provide any additional information over T[1:3]. In other words, it becomes important to mine maximal temporally anomalous sub-trajectories, i.e., temporally anomalous sub-trajectories that deviate the most from other sub-trajectories (e.g., with respect to a predetermined standard).

As such, there are broadly contemplated herein, in accordance with at least one embodiment of the invention, methods and arrangements for mining maximal temporally anomalous sub-trajectories with particular effectiveness. At a very general level, FIG. 2 provides an overview of main steps in a procedure broadly contemplated herein. Again with reference to a vehicle driving example, the procedure inputs or accepts a stream of trajectories (input data) 203, which are mapped to an underlying road network (211) using map matching 205 (for which any suitable process may be employed); a network-constrained trajectory stream 207 then serves as the input data to form the network. Each trajectory in the stream of trajectories 203, in the present example, represents the driving pattern of one vehicle. For each road segment in the network 211, speed distribution for each vehicle (which, in the present example, can be regarded as the speed of a vehicle at different times over the road segment) is approximated using any suitable process, e.g., a Gaussian process. In other words, such a speed distribution can essentially be simplified for meaningful quantitative analysis, e.g., by reasonably approximating vehicle speed at different times over a road segment. Alternatively, such approximation can attribute a single speed to a road segment if road segments are defined with a given degree of granularity that would lead to meaningful quantitative analysis. Iterative updates (209) can be performed on the road network 211, on a per-query basis.

In accordance with at least one embodiment of the invention, with data now so resolved, a background model 213 constituted by the road network, and speed distributions of vehicles traveling thereupon, is analyzed, and a determination is made of anomalous edges 215. If any originally incoming trajectory contains at least one anomalous edge, the trajectory is fed to an anomaly miner engine. The anomaly miner engine iteratively expands the anomalous edges (via a "merge and expand" algorithm 217, which will be appreciated more fully below) to form larger sub-trajectory candidates, and terminates by computing a set of anomalous islands 219. In that connection, an involved heuristic can ensure all the maximal anomalous sub-trajectories of a query trajectory are contained in the anomalous islands. As will be appreciated more fully herebelow, this process first starts with L and R. In further iterations, potentials L and R are merged, based upon certain deciding criteria (overlapping, adjacent); the iterations stop when no such further merging is possible.

In accordance with at least one embodiment of the invention, the aforementioned anomalous islands represent partitions of a trajectory wherein all maximally anomalous subtrajectories are contained in the set of islands, and wherein no maximally anomalous sub-trajectory spans across two islands. Based on these properties, the procedure performs a bi-directional sliding window search (221) to mine maximal anomalies (223) from each island. As will be appreciated more fully from the ensuing discussion, key advantages can be derived from finding the aforementioned anomalous islands In accordance with at least one embodiment of the invention, it is recognized that, given a set of historical trajectories, where bounded movement is assumed, and given a set of query trajectories relative to a given user, is it possible to identify whether this set, per se, displays anomalous behavior. In this connection, an anomaly would be understood to form part or all of a trajectory, quantifiably above an acceptable threshold (e.g., over a given speed in a road travel scenario); thus, such an anomaly can end up being computed automatically on the basis of historical trajectories. It is also possibly to identify maximal anomalous sub-trajectories, and to aggregate the results of a trajectory set and, in that connection, quantify the acceptability of a given user's behavior.

Figure 3:
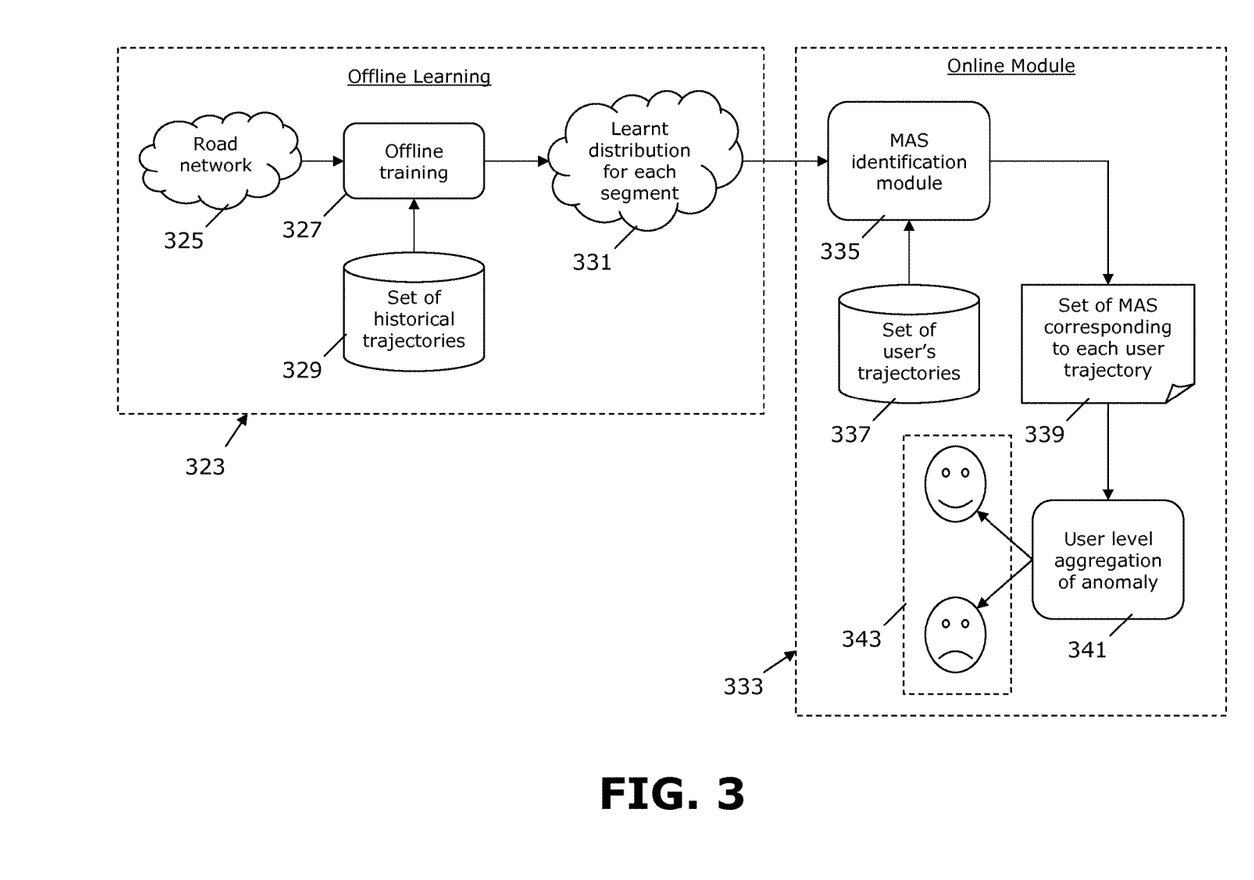
FIG. 3 schematically illustrates a system architecture.

FIG. 3 schematically illustrates a system architecture, in accordance with at least one embodiment of the invention. As shown in FIG. 3, offline learning 323 (here, a one-time offline task) involves representing a dataset as a network (325). Here, via offline training 327, for an input set of trajectories, there is found a cluster with which the dataset closely matches. Then, trajectories from that cluster are considered for network representation, where important junctions are considered as nodes and the paths between the junctions are considered the edges. The edges are considered to be directional, given the presence of a sequence in the trajectory. Then, the dataset is filtered with respect to each of the trajectories in the query set in order to attain matching.

Additionally, in accordance with at least one embodiment of the invention, a historical distribution of travel times (from a historical trajectory set 329) is learned (via offline training 327) for each of the segments. Particularly, for each edge a distribution 331 is obtained, characterizing the patterns (e.g., driving patterns) at those edges.

In accordance with at least one embodiment of the invention, an online module 333 can be employed in determining a maximal anomalous subtrajectory (MAS) (335) based on one or more user trajectories (337). To this end, an anomaly can first be determined using Mahalanobis Distance. As such, one-length anomalous edges are identified. A more detailed discussion follows.

In accordance with at least one embodiment of the invention, to define an anomaly based on Mahalanobis Distance, for each of the edges $e_i$ a distribution of travel times is learned. Here, it is assumed that the learnt distribution is a normal distribution having mean $\mu_i$ and standard deviation $\sigma_1$. Let a subsequence be $S=[t_1, t_2, \ldots, t_n]$ defined by the travel times at n edges. The subsequence is anomalous for a given threshold $\theta$ if the travel times, on average, are more than $\theta$ standard deviations away from the population in the traversed edges. A mathematical representation of Mahalanobis Distance d(s) is shown below, to determine whether a subtrajectory s is anomalous. Accordingly, d(s) is calculated as follows:

$$d(s) = \sqrt{\sum_{i=1}^{n} \frac{(\mu_{e_i} - t_{e_i})^2}{\sigma_{e_i}^2}}$$

Then, s is considered to be anomalous if:

$$d(s) \geq \sqrt{\sum_{i=1}^{n} \theta^2} = \sqrt{n}\,\theta$$

In accordance with at least one embodiment of the invention, to identify a maximal anomalous sub-trajectory, a trajectory is first scanned to identify all one-length anomalous sub-trajectories; these form an initial seed set. This list is then sorted based on index. Then, for each edge e in the seed-set, there is found the longest list that remains anomalous by adding only left edges to it; this list can be labeled L(e). Similarly, a list R(e) can be developed by adding right edges. L(e) and R(e) are then stored, and saved in a list indexed by e. For each $e_i$ in the index, a check is run to determine if there an $e_j$ therein such that $e_j$ occurs after $e_i$ in sequence and $R(e_i)$ is adjacent to or is overlapping with $L(e_j)$. If so, then $e_i$ and $e_j$ are removed from the index, and sub-trajectory boundary {startIndex of $R(e_i)$–endIndex of $L(e_j)$} is inserted. This removal is possible because the resultant sub-trajectory boundary ensures that no maximally anomalous sub-trajectories contained in previous boundaries are discarded. At the same time, this new boundary can include additional potential maximally anomalous sub-trajectories.

In accordance with at least one embodiment of the invention, if for any $e_i$ it is found that both $L(e_i)$ and $R(e_i)$ are contained by either $L(e_j)$ or $R(e_j)$, then $e_i$ is removed from the index. If any new sub-trajectory is inserted as noted above, then the process reverts to the step of creating and storing L(e) and R(e). Otherwise, the process terminates. After terminating, the maximal sub-trajectory bounded by L and R is reported.

In accordance with at least one embodiment of the invention, the results of trajectories in the set are aggregated (339). A determination is made as to whether a candidate displays excessive values (e.g., over-speeding) or not. To this end, a computation is made as to what portion (e.g., percentage) of the entire trajectory is constituted by a maximal anomalous trajectory (341). These proportions or percentage values are aggregated for the trajectory set and, based on a predetermined (e.g., user-specific) threshold, a determination is made as to the acceptability of the individual's behavior (e.g., driving behavior) (343).

It can be appreciated from the foregoing that, in accordance with at least one embodiment of invention, a technical improvement is represented at least via automatic identification of anomalous paths or segments from trajectory data, including a maximal anomalous sub-trajectory, as well as via the identification of anomalous behavior of an individual based on an aggregation of anomalous trajectories.

In accordance with at least one embodiment of the invention, very generally, quantitative values as determined herein, or other data or information as used or created herein, can be stored in memory or displayed to a user on a screen, as might fit the needs of one or more users.

Figure 4:
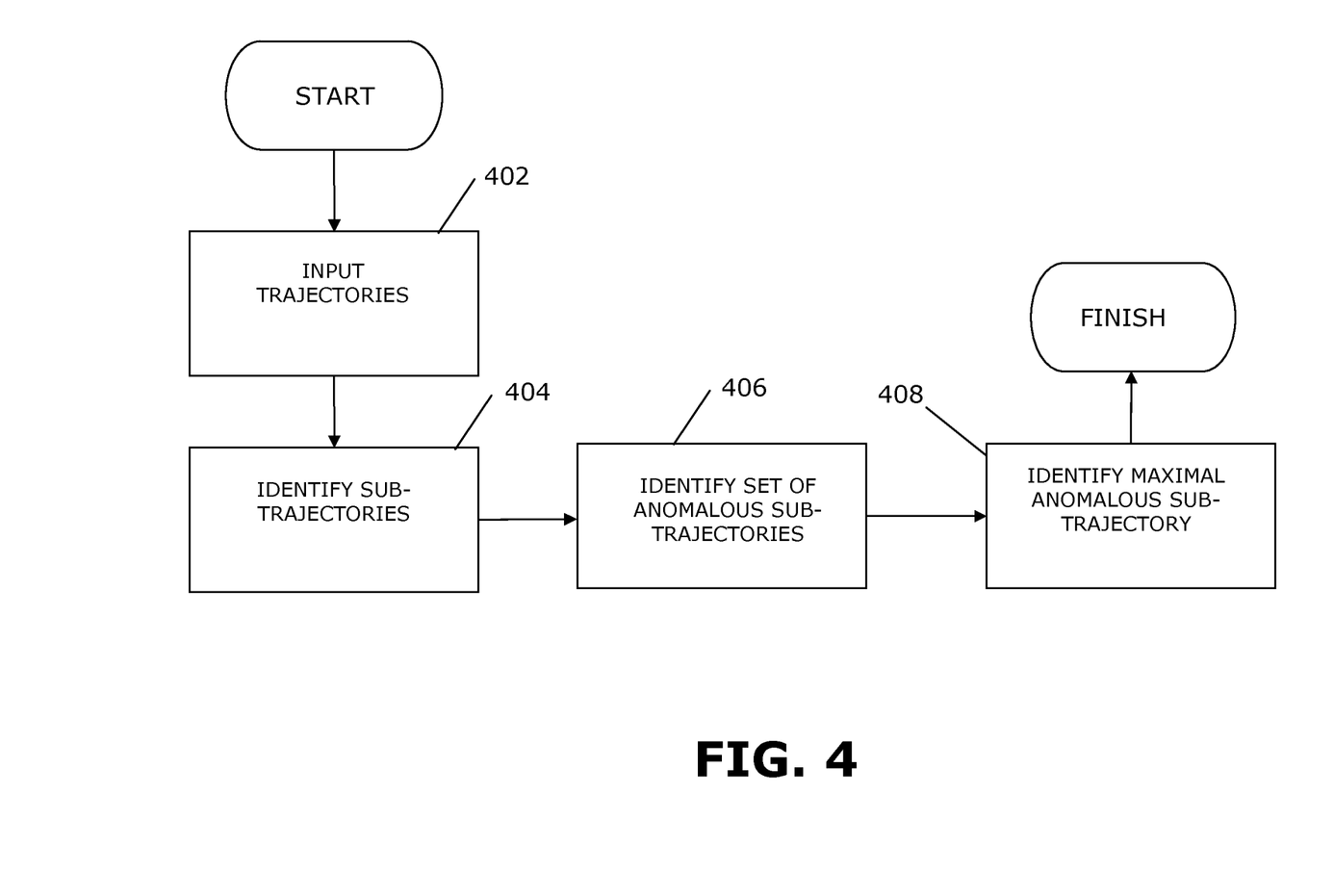
FIG. 4 sets forth a process more generally for discerning at least one anomalous sub-trajectory in at least one trajectory.

FIG. 4 sets forth a process more generally for identifying at least one anomaly in a path taken by a plurality of objects, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a plurality of trajectories are input, wherein each trajectory comprises a data set indicative of a path taken by a plurality of objects from a starting point to an ending point, wherein the starting point and ending point are substantially similar for each trajectory (402). A plurality of sub-trajectories within the input trajectories are identified (404). There are identified, within the plurality of sub-trajectories, a set of sub-trajectories that are anomalous when compared to other sub-trajectories within the plurality of sub-trajectories, wherein the anomalous sub-trajectories deviate from a predetermined standard (406). A maximal anomalous sub-trajectory is identified from among the identified set of anomalous sub-trajectories (408).

Figure 5:
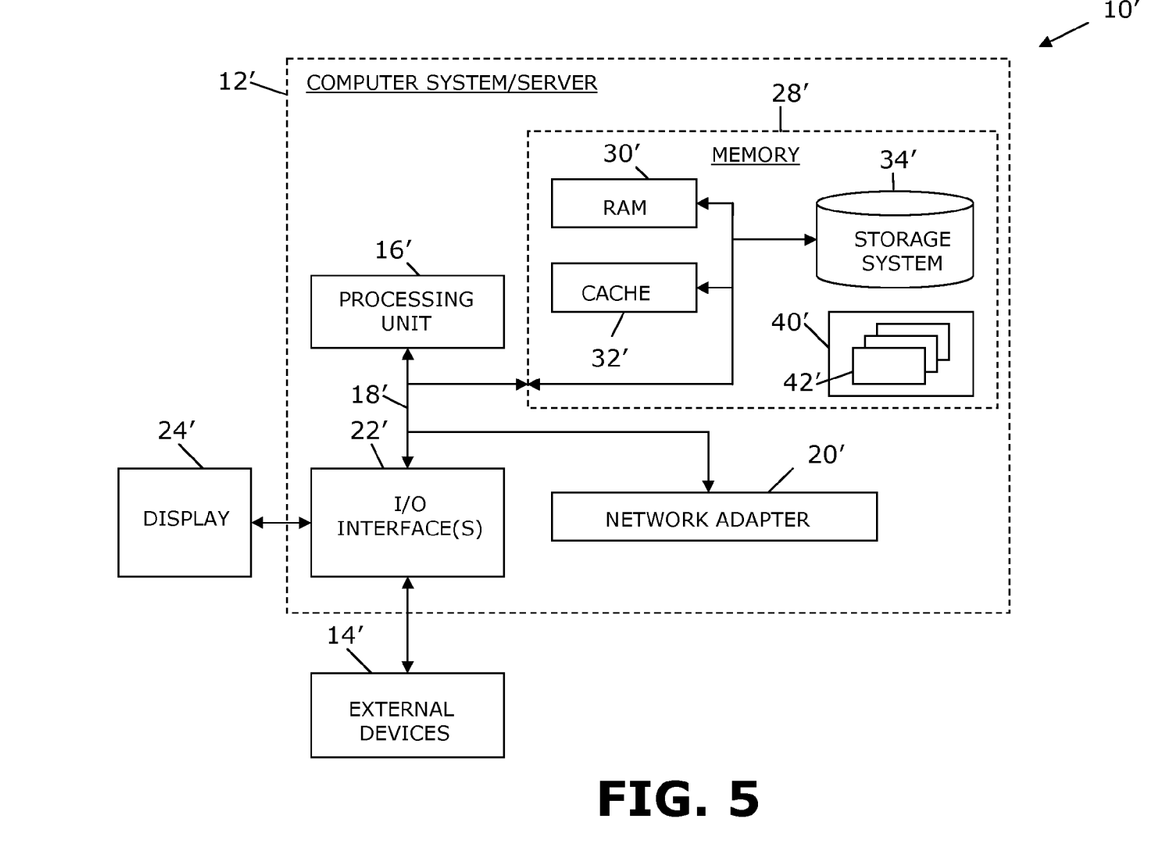
FIG. 5 illustrates a computer system.

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying at least one anomaly in a path taken by a plurality of objects, said method comprising:
   controlling at least one processor to execute computer code that performs the steps of:
   inputting a plurality of trajectories, wherein each trajectory comprises a data set indicative of a path taken by a plurality of vehicles from a starting point to an ending point, wherein the starting point and ending point are substantially similar for each trajectory and wherein each of the plurality of trajectories is manned to a road network:
   identifying a plurality of sub-trajectories within the input trajectories, wherein each of the plurality of sub-trajectories comprise a portion of the path taken by the plurality of vehicles:
   identifying a set of sub-trajectories, within the plurality of sub-trajectories, that are anomalous when compared to other sub-trajectories within the plurality of subtrajectories, wherein the anomalous sub-trajectories deviate from a predetermined standard, wherein the identifying comprises identifying an average travel time with respect to the each of the plurality of sub-trajectories using a historical distribution of travel times and wherein the anomalous sub-trajectories are identified based upon the sub-trajectory exceeding the average travel time by a predetermined deviation amount; and
   obtaining a maximal anomalous sub-trajectory from among the identified set of anomalous sub-trajectories by sorting the anomalous sub-trajectories within the set of sub-trajectories and identifying the anomalous sub-trajectory from the sorted set, wherein the maximal anomalous sub-trajectory comprises a sub-trajectory associated with one of the plurality of vehicles that identifies the one of the plurality of vehicles as engaging in an undesired driving pattern.

2. The method according to claim 1, wherein the set of anomalous sub-trajectories comprises one-length sub-trajectories.

3. The method according to claim 1, wherein said identifying of a maximal anomalous sub-trajectory comprises adding an edge to each of the anomalous sub-trajectories.

4. The method according to claim 3, wherein said adding of an edge comprises adding one of: a left edge or a right edge.

5. The method according to claim 4, wherein said identifying of a maximal anomalous sub-trajectory comprises subsequently adding the other of: a left edge or a right edge.

6. The method according to claim 1, wherein said identifying of a maximal anomalous sub-trajectory comprises:
   adding at least one edge to each of the anomalous one-length sub-trajectories;
   finding the longest list of sub-trajectories that remain anomalous subsequent to said adding of at least one edge; and
   iterating said steps of adding and finding until a maximal anomalous sub-trajectory is determined.

7. The method according to claim 1, comprising determining anomalous behavior via comparing the maximal anomalous sub-trajectory to a corresponding input trajectory.

8. The method according to claim 7, wherein said determining of anomalous behavior comprises determining a proportion of the corresponding input trajectory accounted for by the maximal anomalous sub-trajectory, and comparing the proportion to a predetermined threshold.

9. The method according to claim 1, wherein said identifying of a set of sub-trajectories comprises deriving the anomalous sub-trajectories from the data sets of the input trajectory.

10. The method according to claim 9, wherein said learning comprises computing at least one Mahalanobis Distance.

11. The method according to claim 1, wherein the input trajectories comprise speed distributions relative to vehicle travel over a road network.

12. An apparatus for identifying at least one anomaly in a path taken by a plurality of objects, said apparatus comprising:
   at least one processor; and
   a computer readable storage medium having computer readable program code embodied therewith and executable by the at least one processor, the computer readable program code comprising:
   computer readable program code configured to input a plurality of trajectories, wherein each trajectory comprises a data set indicative of a path taken by a plurality of vehicles from a starting point to an ending point, wherein the starting point and ending point are substantially similar for each trajectory and wherein each of the plurality of trajectories is mapped to a road network:
   computer readable program code configured to identify a plurality of subtrajectories within the input trajectories, wherein each of the plurality of sub-trajectories comprise a portion of the path taken by the plurality of vehicles:
   computer readable program code configured to identify a set of sub-trajectories, within the plurality of sub-trajectories, that are anomalous when compared to other subtrajectories within the plurality of sub-trajectories, wherein the anomalous sub-trajectories deviate from a predetermined standard, wherein the identifying comprises identifying an average travel time with respect to the each of the plurality of sub-trajectories using a historical distribution of travel times and wherein the anomalous sub-trajectories are identified based upon the sub-trajectory exceeding the average travel time by a predetermined deviation amount; and
computer readable program code configured to obtain a maximal anomalous sub-trajectory from among the identified set of anomalous sub-trajectories by sorting the anomalous sub-trajectories within the set of sub-trajectories and identifying the anomalous sub-trajectory from the sorted set, wherein the maximal anomalous sub-trajectory comprises a sub-trajectory associated with one of the plurality of vehicles that identifies the one of the plurality of vehicles as engaging in an undesired driving pattern.

13. A computer program product for identifying at least one anomaly in a path taken by a plurality of objects, said computer program product comprising:
a computer readable storage medium having computer readable program code embodied therewith, the computer readable program code comprising:
computer readable program code configured to input a plurality of trajectories, wherein each trajectory comprises a data set indicative of a path taken by a plurality of vehicles from a starting point to an ending point, wherein the starting point and ending point are substantially similar for each trajectory and wherein each of the plurality of trajectories is mapped to a road network;
computer readable program code configured to identify a plurality of subtrajectories within the input trajectories, wherein each of the plurality of sub-trajectories comprise a portion of the path taken by the plurality of vehicles;
computer readable program code configured to identify a set of sub-trajectories, within the plurality of sub-trajectories, that are anomalous when compared to other subtrajectories within the plurality of sub-trajectories, wherein the anomalous sub-trajectories deviate from a predetermined standard, wherein the identifying comprises identifying an average travel time with respect to the each of the plurality of sub-trajectories using a historical distribution of travel times and wherein the anomalous sub-trajectories are identified based upon the sub-trajectory exceeding the average travel time by a predetermined deviation amount; and
computer readable program code configured to obtain a maximal anomalous sub-trajectory from among the identified set of anomalous sub-trajectories by sorting the anomalous sub-trajectories within the set of sub-trajectories and identifying the anomalous sub-trajectory from the sorted set, wherein the maximal anomalous sub-trajectory comprises a sub-trajectory associated with one of the plurality of vehicles that identifies the one of the plurality of vehicles as engaging in an undesired driving pattern.

14. The computer program product according to claim 13, wherein the set of anomalous sub-trajectories comprises one-length sub-trajectories.

15. The computer program product according to claim 13, wherein the identifying of a maximal anomalous sub-trajectory comprises adding an edge to each of the anomalous sub-trajectories.

16. The computer program product according to claim 15, wherein the adding of an edge comprises adding one of: a left edge or a right edge.

17. The computer program product according to claim 16, wherein the identifying of a maximal anomalous sub-trajectory comprises subsequently adding the other of: a left edge or a right edge.

18. The computer program product according to claim 13, wherein the identifying of a maximal anomalous sub-trajectory comprises:
adding at least one edge to each of the anomalous one-length sub-trajectories;
finding the longest list of sub-trajectories that remain anomalous subsequent to said adding of at least one edge; and
iterating said steps of adding and finding until a maximal anomalous sub-trajectory is determined.

19. The computer program product according to claim 13, comprising computer readable program code configured to determine anomalous behavior via comparing the maximal anomalous sub-trajectory to a corresponding input trajectory.

* * * * *